United States Patent Office 3,329,613
Patented July 4, 1967

3,329,613
LUBRICATING-OIL ADDITIVE
Diether Fischer, Ludwigshafen (Rhine), and Herbert Mueller, Frankenthal, Pfalz, Germany, assignors to Badische Anilin- & Soda-Fabrik Aktiengesellschaft, Ludwigshafen (Rhine), Germany
No Drawing. Filed Sept. 24, 1963, Ser. No. 311,233
Claims priority, application Germany, Sept. 29, 1962, B 69,031
2 Claims. (Cl. 252—59)

This invention relates to the use of 1,4-polybutadiene as a lubricating-oil additive. More particularly, it relates to the use of 1,4-polybutadiene having a molecular weight of 1,000 to 10,000 and a substantially uniform (cis) 1,4-structure.

It is known that lubricants based on mineral oils or synthetic products can be improved in their viscosity temperature behavior (VT-behavior) by adding polymers. High molecular weight polymers of hydrocarbons, for example polyisobutylene, particularly polyisobutylene having a mean molecular weight of 15,000, have been proposed as additives. The low solubility of these polymers in mineral oils is a disadvantage. It is therefore necessary first of all to prepare a stock solution of polyisobutylene by a certain method and then to use this stock solution as the additive. The viscosity index (V.I.) is only relatively slightly improved by polyisobutylene.

It has also been proposed to use polymers of various acrylic acid esters or methacrylic acid esters and also their copolymers with other polymerisable substances. By adding these polymers having ester groups to the mineral oils, substances of a different chemical nature are introduced into the mineral oil whose presence may deteriorate the other properties of the oils.

When used as additives to lubricating oils, however, both of the said groups of substances undergo a considerable decline in effectiveness under the influence of shearing forces such as always occur for example in the operation of machines and engines as a result of the rapid movement of the piston rings on the surface of the cylinders.

We have now found that polymers of butadiene can be used with special advantage as lubricating-oil additives.

Low molecular weight polymers of butadiene having molecular weights of 1,000 to 10,000, particularly of 3,000 to 6,000, and a substantially uniform (cis) 1,4-structure are particularly suitable as additives to lubricating oils. By (cis) 1,4-polybutadienes having a substantially uniform cis structure are meant 1,4-polybutadienes in which at least 60% of the double bonds are present in the cis position. These polybutadienes are oily liquids of medium viscosity having instrinsic viscosities of between 0.1 and 0.8 measured at 50° C. in benzene. Polymers of butadiene having substantially uniform (cis) 1,4-structure, such as are obtained by the process of U.S. patent application Ser. No. 261,829, filed Feb. 28, 1963, by Herbert Mueller and Hans Lautenschlager, may for example be used with advantage. In addition to pure polybutadiene, it is also possible to coemploy partly hydrogenated polybutadiene, and it is also possible to replace a portion of the polybutadiene by reaction products of polybutadiene with $\alpha,\beta$-unsaturated acids, esters, anhydrides, amides and imides, for example adducts of maleic anhydride, maleic acid, maleic esters, maleic imide, acrylic acid, acrylic esters and acrylamide to polybutadiene.

These additives may be incorporated direct with the lubricating oils to be improved without having previously to be converted into a suitable form, for example into a solution.

The viscosity-temperature behavior is improved by the use of the additives according to this invention without inadmissible increase in viscosity, i.e. polybutadiene and its hydrogenation products and adducts combine the advantages of acrylic or methacrylic acid polymers containing ester groups with the advantages of the known additives consisting of polymers of hydrocarbons such as polyisobutylene. The particular advantage of the lubricating-oil additives according to this invention is the practically complete shear resistance of the treated lubricating oils, in addition to the improvement in the viscosity index. Multigrade motor oils such as SAE 5W/20, SAE 10W/30 and SAE 20W/40, may be prepared by adding polybutadiene or its hydrogenation and addition products. Gear oils may also be improved in their VT-behavior and converted for example into multigrade gear oils SAE 80/90. The additives according to this invention may be used alone or in combination with HD-additives, EP-additives, ageing inhibitors, corrosion inhibitors or other conventional oil additives.

The effect of the lubricating-oil additives is illustrated in the following examples.

Example 1

A 1,4-polybutadiene having the intrinsic viscosity 0.22 and a mean molecular weight of 4050 determined by osmometry is added to a solvent-refined motor lubricating oil (oil A) of the class SAE 20W/20 in varying amounts. According to IR analysis, in the 1,4-polybutadiene used 78% of the double bonds are present in the cis position, 20% in the trans position and 2% in vinyl groups. The viscosities are measured according to DIN51562 in the Ubbelohde capillary tube and are indicated in centistokes (cs.), and the viscosity index (V.I.) is calculated therefrom according to ASTM-D-567.

TABLE I

|  | CS./37.8° C. | CS./98.9° C. | V.I. |
|---|---|---|---|
| Oil A without addition | 70.14 | 8.05 | 88 |
| Oil A containing 2% of 1,4-polybutadiene | 80.22 | 9.61 | 106 |
| Oil A containing 4% of 1,4-polybutadiene | 91.08 | 11.19 | 115 |
| Oil A containing 6% of 1,4-polybutadiene | 103.19 | 13.09 | 123 |
| Oil A containing 8% of 1,4-polybutadiene | 117.22 | 15.24 | 128 |
| Oil A containing 10% of 1,4-polybutadiene | 131.31 | 17.56 | 132 |
| Oil A containing 12% of 1,4-polybutadiene | 146.27 | 20.05 | 135 |
| Oil A containing 15% of 1,4-polybutadiene | 172.08 | 24.32 | 136 |

Example 2

A multigrade oil 10W/30 may be prepared by adding 1,4-polybutadiene as desccribed in Example 1 to a solvent-refined motor lubricating oil (oil B).

TABLE II

|  | Cs./37.8° C. | Cs./98.9° C. | V.I. | SAE |
|---|---|---|---|---|
| Oil B without addition | 46.60 | 6.62 | 103 | 10W/20 |
| Oil B containing 5% of 1,4-polybutadiene | 65.47 | 10.04 | 133 | 10W/30 |

Example 3

For determining the shear resistance of lubricating-oil additives the usual method using a diesel injection nozzle may be employed.

The polymer solutions are forced at a pressure of about 180 atm. through a diesel injection nozzle and the decline in the viscosity and in the viscosity index is measured after different numbers of passages through the nozzle. If there is sensitivity to shearing, the decline becomes noticeable particularly in the first few passages so that continuance beyond twenty passages is not necessary.

Mixing 6.75 parts of 1,4-polybutadiene with 93.25 parts of the oil, both as described in Example 1, increased its viscosity index from 88 to 125. When subjected to the shear resistance test, the following results are obtained:

TABLE IIIa

| Number of passages | 0 | 1 | 2 | 5 | 10 | 20 |
|---|---|---|---|---|---|---|
| Cs./37.8° C | 108.06 | 108.00 | 107.84 | 107.66 | 107.64 | 108.00 |
| Cs./98.9° C | 13.86 | 13.76 | 13.82 | 13.82 | 13.82 | 13.75 |
| V.I | 125 | 125 | 125 | 125 | 125 | 125 |

The polybutadiene suffers no degradation by this test.

However, when testing the same oil containing 3.8% of a 1,4-polybutadiene having a mean molecular weight of 6,400 and in which 80% of the double bonds are present in the cis position, 17% in the trans position and 3% in vinyl groups, the results given in the following table are obtained:

TABLE IIIb

| Number of passages | 0 | 1 | 2 | 5 | 10 | 20 |
|---|---|---|---|---|---|---|
| Cs./37.8° C | 112.34 | 111.90 | 111.36 | 111.04 | 111.06 | 110.80 |
| Cs./98.9° C | 14.21 | 14.14 | 14.06 | 14.08 | 13.99 | 13.99 |
| V.I | 125 | 125 | 125 | 125 | 124 | 124 |

Example 4

Mixtures of oil A with various agents for improving the viscosity index are prepared and the properties of the lubricating oils investigated. All the mixtures are so adjusted that the same viscosity index level of about 125 to 126 is reached, different quantities of additive being necessary for this purpose. The oils thus adjusted to the same effect are subjected to the shear resistance test described in Example 3 and the decline after twenty passages is determined. The exceptional position of a polybutadiene is evident from this comparison:

TABLE IV

| Oil A containing— | Cs./37.8° C. | Cs./98.9° C. | V.I. | Decline after shearing twenty times | | |
|---|---|---|---|---|---|---|
| | | | | Cs./37.8° C. | Cs./98.9° C. | V.I. |
| 6.75% of polybutadiene mean molecular weight 4,050 | 108.06 | 13.86 | 125 | | | |
| 3.80% of polybutadiene mean molecular weight 6,400 | 112.34 | 14.21 | 125 | 1.54 | 0.22 | 1 |
| 5.0% of product I | 107.73 | 13.96 | 126 | 22.60 | 3.47 | 13 |
| 6.7% of product II | 129.23 | 16.14 | 126 | 29.72 | 4.20 | 10 |
| 4.75% of product III | 103.60 | 13.52 | 126 | 15.69 | 2.50 | 9 |
| 4.0% of product IV | 109.65 | 14.12 | 126 | 13.92 | 2.32 | 9 |
| 4.0% of product V | 91.49 | 12.24 | 125 | 9.72 | 2.02 | 12 |
| 30.0% of polyisobutylene mixture (equivalent to 6% of polyisobutylene) | 384.50 | 38.47 | 125 | 108.24 | 10.57 | 2 |

The substances referred to as products I to V in Table IV are mixtures of acrylic esters and methacrylic esters of various alcohols ($C_2$ to $C_{20}$) which are dissolved in lubricating oil in the ratio 1:1.

We claim:

1. A lubricant comprising in combination (1) a lubricating oil and (2) a minor amount of a polymer of butadiene having a molecular weight of 1,000 to 10,000 and a substantially uniform (cis) 1,4-structure.

2. A lubricant comprising in combination (1) a lubricating oil and (2) a minor amount of a polymer of butadiene having a molecular weight of 3,000 to 6,000 and a substantially uniform (cis) 1,4-structure.

References Cited
UNITED STATES PATENTS

| | | | |
|---|---|---|---|
| 2,542,542 | 2/1951 | Lippincott | 252—56 |
| 3,018,250 | 1/1962 | Anderson et al. | 252—51.5 |
| 3,166,542 | 1/1965 | Orzechlowki et al. | 252—59 |
| 3,172,892 | 3/1965 | Le Suer | 252—51.5 |
| 3,178,402 | 3/1965 | Smith et al. | 260—94.3 |
| 3,203,945 | 8/1965 | Zelinski | 260—94.3 |

DANIEL E. WYMAN, *Primary Examiner.*

J. R. McBRIDE, W. H. CANNON, *Assistant Examiners.*